United States Patent [19]

Cox et al.

[11] Patent Number: 4,570,839
[45] Date of Patent: Feb. 18, 1986

[54] PRESS

[75] Inventors: Gordon C. Cox, Rushden; Peter Shorrock, Bedford, both of England Britain

[73] Assignee: Leslie Hartridge Limited, Buckinghamshire, England

[21] Appl. No.: 687,483

[22] Filed: Dec. 28, 1984

Related U.S. Application Data

[63] Continuation of Ser. No. 379,485, May 18, 1982, abandoned.

[30] Foreign Application Priority Data

Oct. 6, 1981 [GB] United Kingdom ............... 8130160
Mar. 24, 1982 [GB] United Kingdom ............... 8208617

[51] Int. Cl.⁴ .................... B21J 15/28; B23Q 11/00
[52] U.S. Cl. ............................ 227/1; 72/477; 100/53; 227/8; 227/129; 227/131
[58] Field of Search ............... 72/352, 472, 477; 100/53; 227/1, 8, 2, 3, 4, 5, 15, 18, 120, 129, 131

[56] References Cited

U.S. PATENT DOCUMENTS

| | | | |
|---|---|---|---|
| 1,809,322 | 6/1931 | Warner | 72/477 |
| 2,230,518 | 2/1941 | Weinhold | 227/61 |
| 3,237,832 | 3/1966 | Wilson | 227/18 X |
| 3,750,925 | 8/1973 | Schmidt et al. | 227/18 |
| 3,955,739 | 5/1976 | Markus et al. | 227/1 |
| 4,144,736 | 3/1979 | Honda | 72/472 X |
| 4,220,275 | 9/1980 | Hametner et al. | 227/5 |
| 4,247,032 | 1/1981 | Stanik | 227/129 X |
| 4,378,900 | 4/1983 | Sauermilch | 227/8 |
| 4,387,632 | 6/1983 | Heiberger | 100/53 X |
| 4,391,358 | 7/1983 | Haeger | 29/708 X |

FOREIGN PATENT DOCUMENTS

| | | |
|---|---|---|
| 0007776 | 2/1980 | European Pat. Off. . |
| 1276794 | 6/1972 | United Kingdom . |
| 1513862 | 6/1978 | United Kingdom . |
| 2092946 | 8/1982 | United Kingdom . |

OTHER PUBLICATIONS

"Hardware Inserting Press" Brochure by High Quality Engineering, Inc., Oakdale, CA on the Haeger Press, dated Mar. 1, 1981.

Primary Examiner—Paul A. Bell
Attorney, Agent, or Firm—Berman, Aisenberg & Platt

[57] ABSTRACT

A press having a generally "C" shaped frame, punch mounting means arranged on an upper part of the frame, and anvil support means provided on a lower part of the frame. A relatively deep throat is thereby afforded for sheet metal which may be inserted between said punch mounting means and said anvil support-means. Anvil-support suspension mounting means are provided on the upper part of the frame to allow a further anvil support to be suspended from that part of the frame, whereby smaller work can be operated on by the machine.

12 Claims, 15 Drawing Figures

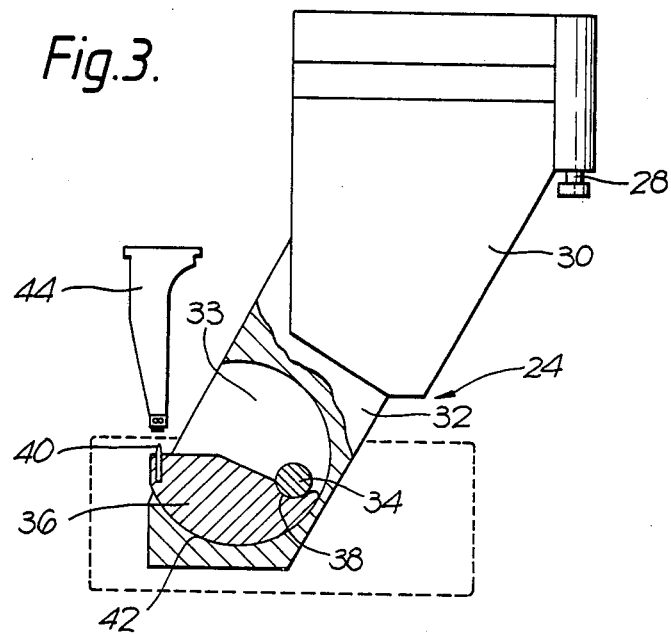
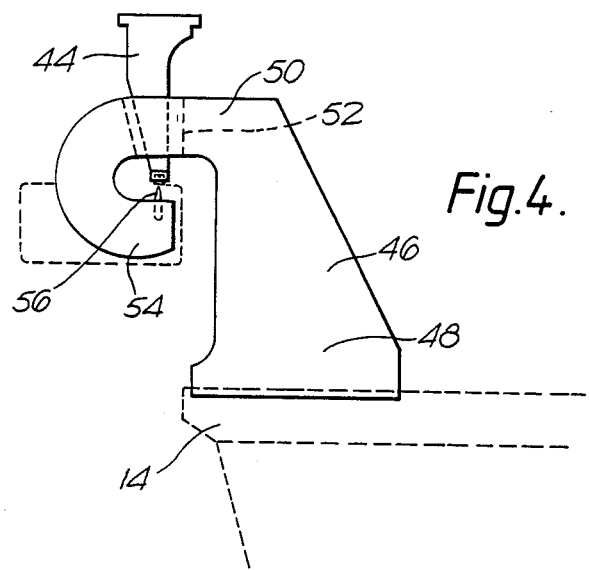

Fig. 12.
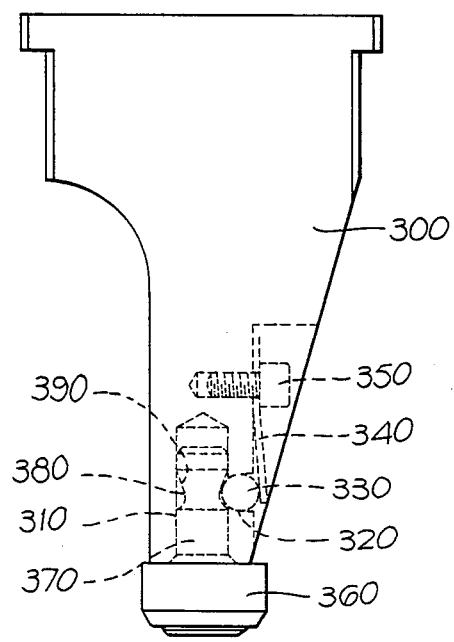
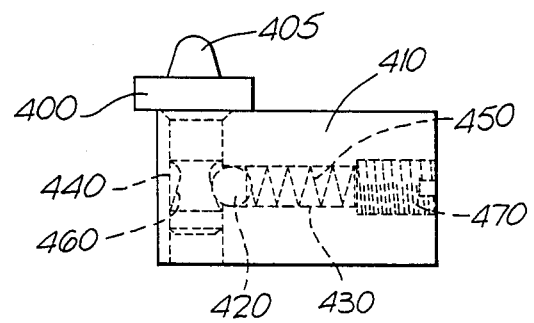

PRESS

This application is a continuation of Application Ser. No. 379,485, filed May 18, 1982.

The present invention relates to a press, especially a rivet bush inserting machine.

A rivet bush, or clinch nut, comprises a head portion in the form of a nut, and a short shank portion which may be inserted in a hole in sheet metal, or punched through a sheet of metal, and bent backwards around its periphery to clinch the sheet metal and firmly secure the nut thereto. The shank may be serrated to inhibit rotation of the nut once inserted. This serration may be given to the shank by cold forging at the time of manufacture of the rivet bush, or it may be formed on the shank at the time of insertion, by an appropriate formation on the inserting machine. Another form of rivet component which may be inserted by the same machine is a rivet stud, which comprises a similar shank portion to the rivet bush, by means of which the rivet stud is firmly secured to sheet metal, but with an externally screwthreaded portion in place of the internally threaded head portion of a rivet bush. When such a rivet stud is fixed into a sheet of metal, its externally screwthreaded portion stands proud of the sheet acting as a bolt by means of which various parts may be fixed to the sheet metal.

Further forms of rivet components comprise a rivet bush with a straight bore, instead of an internally screwthreaded bore, and a rivet stud with a simple spigot or pillar instead of an externally screwthreaded portion.

Instead of having shank portions which are serrated, these various forms of rivet components may have some other kind of radial interruption by which the sheet metal can bite into the component to prevent it rotating once inserted into sheet metal.

It is possible to use the same inserting machine to insert one or other of these rivet components into a solid casting, for example, instead of sheet metal.

Hitherto, rivet components have been secured to sheet metal or to a solid casting or other part using a simple hammer, or by using a press which can fix rivet components in very quick time. The former method can be adapted by a skilled craftsman to most kinds of work, but is time consuming and cumbersome. The presses used so far, although calling for much less skilled labour and being very much faster, have been very inflexible from the point of view of variety of application, and are useful only for particular and simple kinds of work. The present invention, in one of its aspects, seeks to provide a press which is much quicker than a hammer, but which is versatile, and capable of inserting rivet bushes or other rivet components in a variety of work, such as solid castings, straight sheet metal, and various sizes of channel or box section metal.

Accordingly, the present invention is directed to a press, especially a rivet bush inserting machine, having means for interchanging punches, punch holders, or other working tools, and/or means for interchanging anvils or anvil holders.

In one of its forms it provides a press, especially a rivet bush inserting machine, having a generally "C" shaped frame, mounting means for a punch arranged on an upper part of the frame, and supporting means for an anvil arranged on, or forming part of a lower part of the frame, thus affording a relatively deep throat for sheet metal, for example, which may be inserted between the punch and the anvil, in which further mounting means are provided on the upper part of the C-shaped frame for a further anvil support to be suspended from that part of the frame, to allow operation by the machine on smaller work, for example box-section or channel-section sheet metal.

Preferably, the first anvil support can be swung away from the mounting means for a punch to allow an anvil on the further anvil support to be positioned in the same place, or approximately in the same place, as an anvil on the first support.

In a further aspect of the present invention, for particularly small work, such as box or channel-section work of particularly small dimensions, there is provided supporting means for an anvil comprising a base part or portion for being attached to a fixed part of a press, especially a rivet bush inserting machine, and an arm which extends away from the base part or portion and has an end which serves as the anvil and which is reversed back towards the base part or portion, there being a hole through the part of the arm which extends away from the base part or portion to allow the insertion through that hole of a punch or other tool so that the latter can be urged against the anvil end of the arm.

Another aspect of the present invention is directed to a press, especially a rivet bush inserting machine, comprising first urging means acting on a punch holder and/or an anvil support of the machine to urge them closer together under a relatively weak force, position detector means arranged to provide an indication of when the punch holder and the anvil support are within a predetermined separation from one another, and second urging means acting on the punch holder and/or the anvil support to urge them together under a relatively strong force when the position detector indicates that they are within the said predetermined separation.

This affords a safety advantage in that, if by accident an operator of the machine should have a finger caught between the punch and the anvil after starting an operating procedure, the full force of the machine will not be exerted on his finger.

In one construction in which this safety feature can be obtained, a spring acts downwardly on the piston of an hydraulic piston and cylinder arrangement to provide the weaker force, and a position switch is arranged to detect when the punch is very close to the anvil and, upon such detection, to cause hydraulic fluid to be fed to the piston and cylinder arrangement to bring about application of the stronger force.

In one of its forms, the present invention may provide a feed mechanism for feeding fixing elements to a work position of a press, comprising drive means constructed to engage such elements, or to engage means which in turn engage such elements, and to move them successively to such a position. For example, the drive means may include a part or parts which projects or project into a recess or hole in a fixing element or a plurality of the fixing elements when the mechanism is in use.

In one particular form, the present invention is directed to the idea of moving fixing elements out of a magazine containing them to feed them successfully to a working position of a press.

Thus, in this particular form, the present invention may provide a feed mechanism for feeding fixing elements to a work position of a press, comprising locating means for removably locating a magazine of fixing elements on the mechanism with one end of the magazine adjacent to the work position, a pusher, which is movably attached to the rest of the feed mechanism, for insertion into such a magazine, initially at the other end thereof, and for movement therealong, and drive means connected to the pusher to move the latter along such a magazine, whereby fixing elements are fed successively to the work position.

Such a mechanism allows bushes to be fed from the magazine quickly and precisely to the work position, avoiding the need for the user to spend time in handling individual bushes.

In another of its aspects, the invention is directed to a magazine containing fixing elements, for use with such a feed mechanism.

According to a further aspect of the present invention, there is provided a holder for holding an anvil or a punch in a press in a readily removeable manner.

Thus, one of the forms of this aspect of the invention provides a holder for removeably holding an anvil or a punch in a press, comprising a bore extending into the holder, for receiving a shank of an anvil or punch, and spring-loaded retaining means arranged in the holder to be moveable transversely of the bore, the spring loading tending to urge the retaining means towards a position in which at least a part thereof protrudes into the bore, whereby an anvil or punch having a shank with a recess or narrowed portion can have its shank inserted in the bore so that the retaining means engage the recess or narrowed portion, to hold the anvil or punch in a readily removeable manner.

Yet another aspect of the invention is directed to a combination of a holder as described in the immediately preceding paragraph, and such an anvil or punch, at least one of the surfaces of the retaining means and the recess or narrowed portion which engage one another being so angled in relation to the transverse direction of movement of the retaining means that the anvil or punch can be readily removed from the holder.

An example of a rivet bush inserting machine in accordance with the present invention is illustrated in the accompanying drawings, in which:

FIG. 3 shows a partly sectional, side view of a different anvil support for use with the machine shown in FIGS. 1 and 2;

FIG. 4 shows a side view of a further different anvil and anvil support for use with the machine shown in FIGS. 1 and 2;

FIG. 12 shows axial sectional views through a punch holder and an anvil holder positioned ready for a pressing action.

Figure 1:
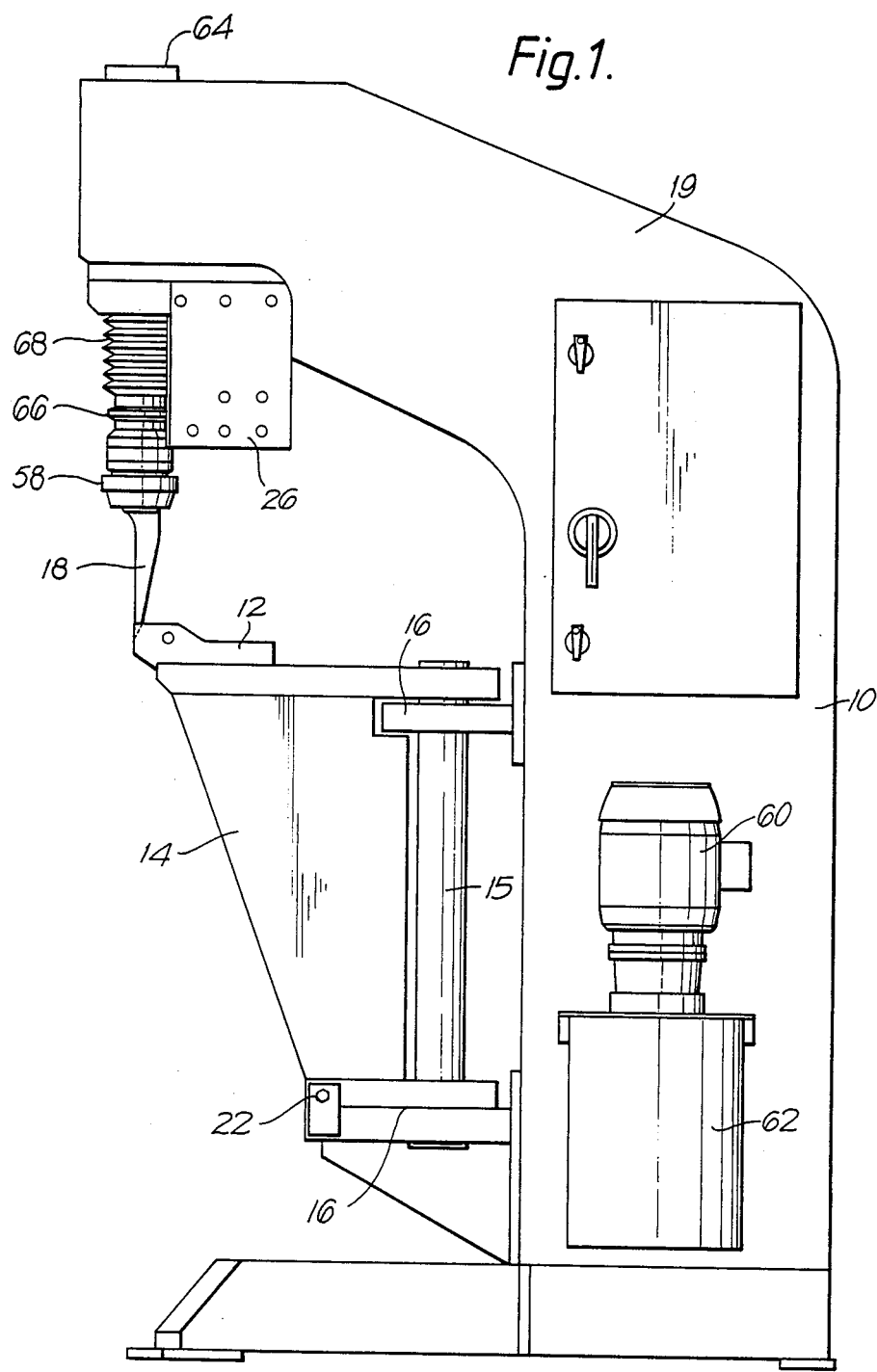
FIG. 1 shows a side elevational view of the machine.
Figure 2:
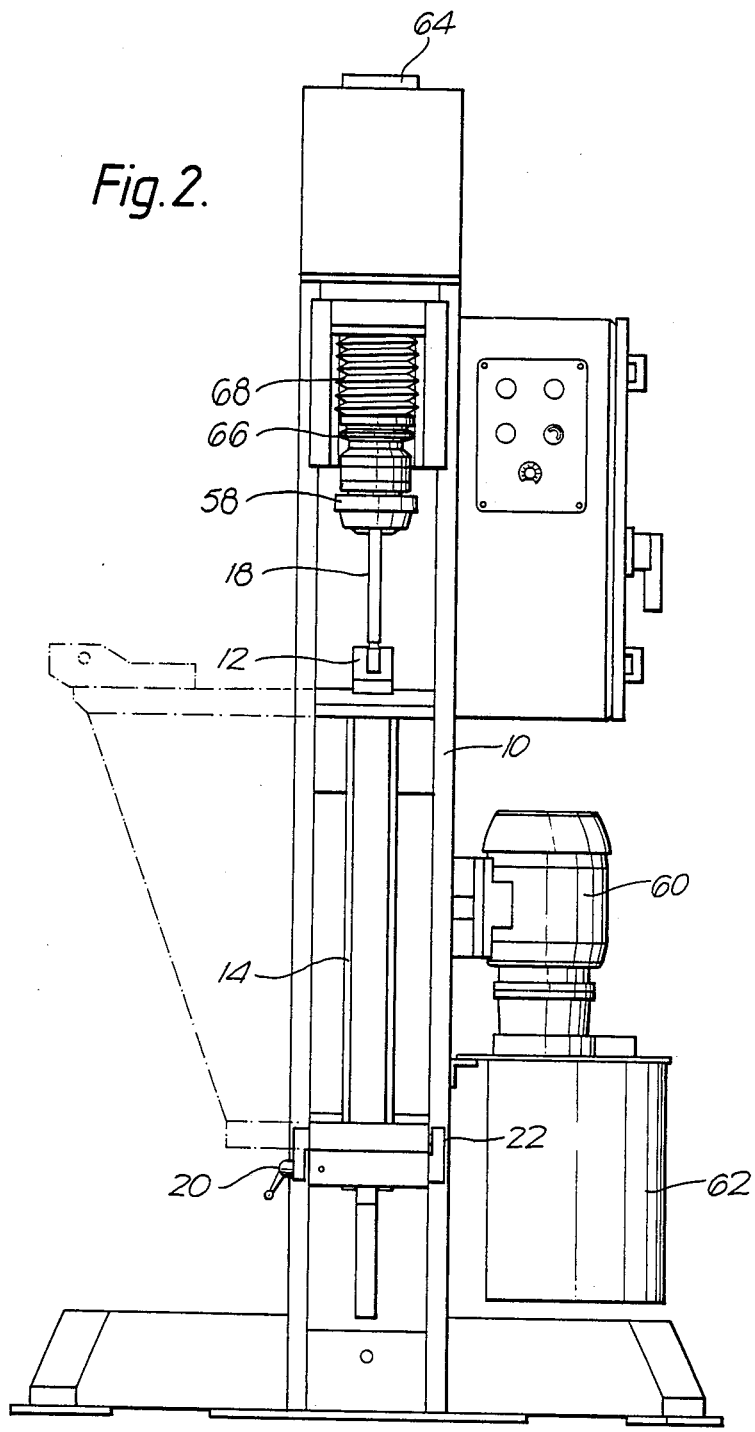
FIG. 2 shows a front elevational view of the machine shown in FIG. 1.

The rivet bush or clinch nut inserting machine shown in FIGS. 1 and 2 comprises a 'C' frame, hydraulically operated down-stroking press. It has a fabricated 'C' frame 10 of heavy duty construction which is capable of withstanding high forces generated during a working cycle, particularly with larger sizes of rivet bushes.

A lower anvil holder 12 is located on an upper forward surface or a rigid triangular swingable arm 14 pivoted about a massive vertical shaft 15 at upper and lower bearings 16. The arm may thereby be swung to a transverse position, shown in broken lines in FIG. 2, away from a punch holder 18 arranged on an upper arm 19 of the machine if the lower anvil holder 12 is not to be used. From there it may be swung back to its normal position shown in full lines in FIGS. 1 and 2, in which the lower anvil 12 is brought directly underneath the punch holder 18. The arm 14 may be locked in this normal position by means of a swinging clamp 20. Adjustment to bring the anvil and punch in precise alignment may be effected by an adjusting screw and locknut 22.

With the arm 14 in its normal position, the machine affords a deep throat for the majority of sheet metal work, in this particular instance the throat being 500 mm in depth.

The punch holder 18 shown in FIGS. 1 and 2 is relatively long, increasing the machines's versatility by allowing penetration into deep sheet metal construction.

For smaller sheet metal work, and in particular for inserting rivet bushes or clinch nuts in box-or channel-section work, the arm 14 may be swung away to one side, as shown by the broken lines in FIG. 2, and an alternative detachable anvil holder 24 shown in FIG. 3 may be slid onto a further mount 26 on the upper arm 19 of the 'C'-frame 10. To allow this, a lower part of the mount 26 and an upper part of the anvil holder 24 have corresponding ribs and recesses, and a spring-loaded plunger 28 on the anvil holder 24 engages a hole or recess in the mount 26 to lock the latter in position. The detachable anvil holder 24 comprises two thick main plates 30 (only one of which is shown) between which is sandwiched an upper end of a downwardly and forwardly projecting support member 32. The latter has a recess 33 which is nearly a full circle extending in a central bisecting plane extending between the main plates 30. Within and towards the rear of this recess, a circularly cross-sectional bar 34 extends transversely across the support member.

A roughly semi-circular anvil 36 has an arcuate shaped recess 38, of the same radius of curvature as the cross-section of the bar 34, at one end, a locating spigot 40 at its other end, and an arcuate base 42 having the same radius of curvature as the circular recess 33 in the supporting member 32. This anvil 36 sits in the support member 32 with its arcuate base resting on the bottom of the circular recess 33 in the support member 32. Therefore, when a downward force is exerted on the spigot end of the anvil 36, downward movement thereof is resisted by the anvil holder 24 as a whole, and rotational movement is resisted by the bar 34.

To allow the overall length of the anvil holder 24 to be reduced, a shorter punch holder 44 may be used.

For particularly small work, a special reverse anvil holder 46 shown in FIG. 3 may be mounted on the top forward surface of the arm 14 with the latter in its normal position. A shorter length punch holder 44 is used for this anvil holder as well. The reverse anvil holder has a base 48 mounted on the arm 14, an arm 50 extending away from an upper part of the base 48, the arm 50 being provided with a hole 52 through which the short length punch holder 44 can extend, and an end 54 which is reversed back towards the base 48. This end 54 acts as the anvil, and is provided with a locating spigot 56 situated directly underneath the hole 52.

The various interchangeable components are constituted to fit into the same mount as far as possible. For example, both the short and the long punch holders 18 and 44 have flanges at there upper ends adapted to fit into and be held by one and the same quarter-turn locking device 58. Both anvil holders 12 and 46 are adapted to be secured to the upper and forward surface of the swingable arm 14. The anvil holder 12 has a similar construction to the lower end of the anvil holder 24 to receive the same anvil 36. The attachments in every case are made for quick interchange.

Figure 5:
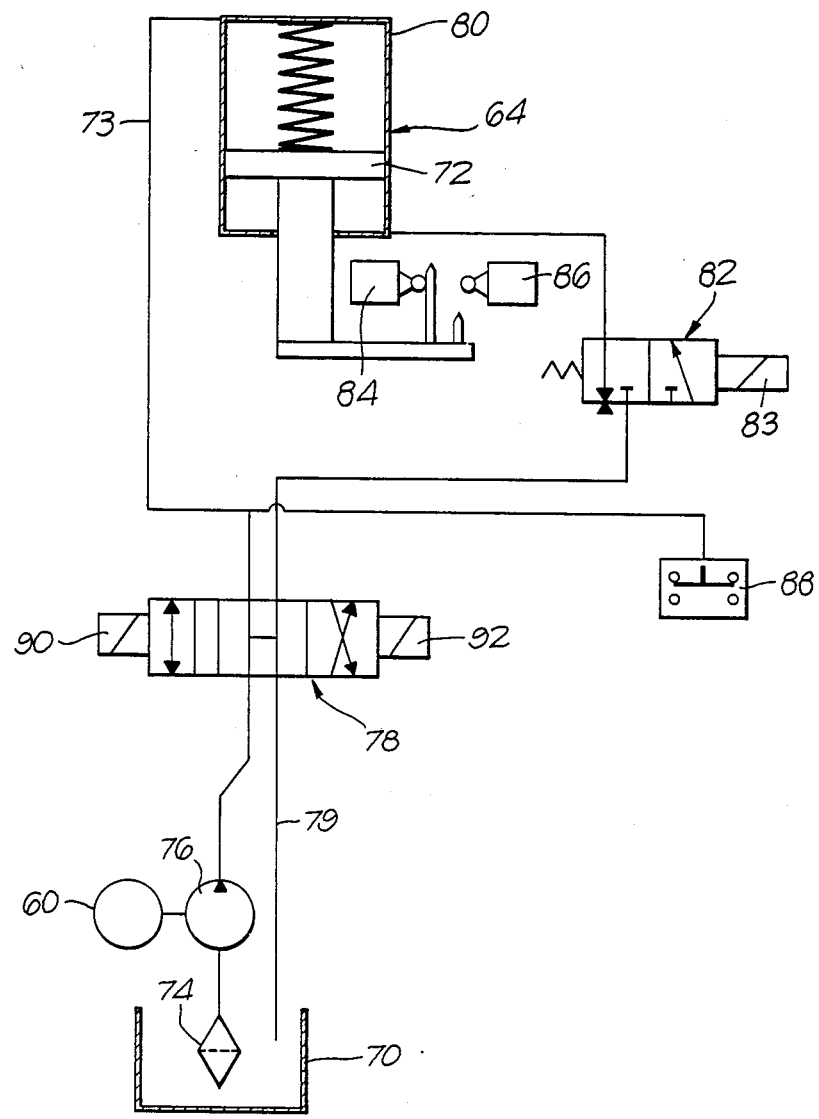
FIG. 5 shows diagrammatically hydraulic circuitry of the machine shown in FIGS. 1 and 2.

Whichever anvil holder and punch holder is used, the same hydraulic system is used to effect the pressing operation of the machine. This system is shown in FIG. 5, and comprises a driving pump motor 60 mounted on one side of the 'C'-frame 10 and coupled to drive a pump in a hydraulic pack 62. The latter is connected to drive a hydraulic piston and cylinder arrangement 64 mounted on the upper end of the 'C'-frame 10. The locking device 58 for the punch holders is fixed to the lower end of the piston in this arrangement 64 via a fine calibrated adjustment 66 to enable the position of the locking device 58 relative to the lower end of the piston to be adjusted towards and away from the anvil holder. A bellows 68 surrounds the free end of the piston to protect the hydraulic cylinder from ingress of dirt or particles.

The hydraulic circuitry of the machine is shown diagrammatically in FIG. 5. Hydraulic fluid from a tank or reservoir 70 is connected to the hydraulic piston and cylinder arrangement 64, on the upper side of the piston 72, by way of a feed line 73 via a filter or strainer 74, a pump 76, and a four-port solenoid operated valve 78. A drain line 79 leads away from this valve back to the tank or reservoir 70. The interior of the cylinder 80 on the underneath side of the piston 72 is also connected to the four-port valve 78 via a two-port solenoid operated valve 82. The piston 72 is provided with an adjustable down limit switch 84, and an up limit switch 86. A spring 81 acts on the piston 72 to urge it downwardly.

An N/C pressure switch 88 is connected to the feed line 73 to enable the working pressure of the hydraulic system to be varied.

The four-port solenoid operated valve 78 has three possible conditions. In its normal position as illustrated in FIG. 5, all four ports are interconnected with one another. When one solenoid 90 of the valve 78 is energised, the feed line 73 is connected to the pump 76, and the two-part valve 82 is connected to the drain line 79. When another solenoid 92 of the valve 78 is energised, the feed line 73 is connected to the drain line 79, and the two-port valve 82 is connected to the pump 76.

The two-port solenoid operated valve 82 is normally in a closed position, but when its solenoid is operated it opens the connection between the interior of the cylinder 80 on the underneath side of the piston 72 and the four-port valve 78.

Figure 6:
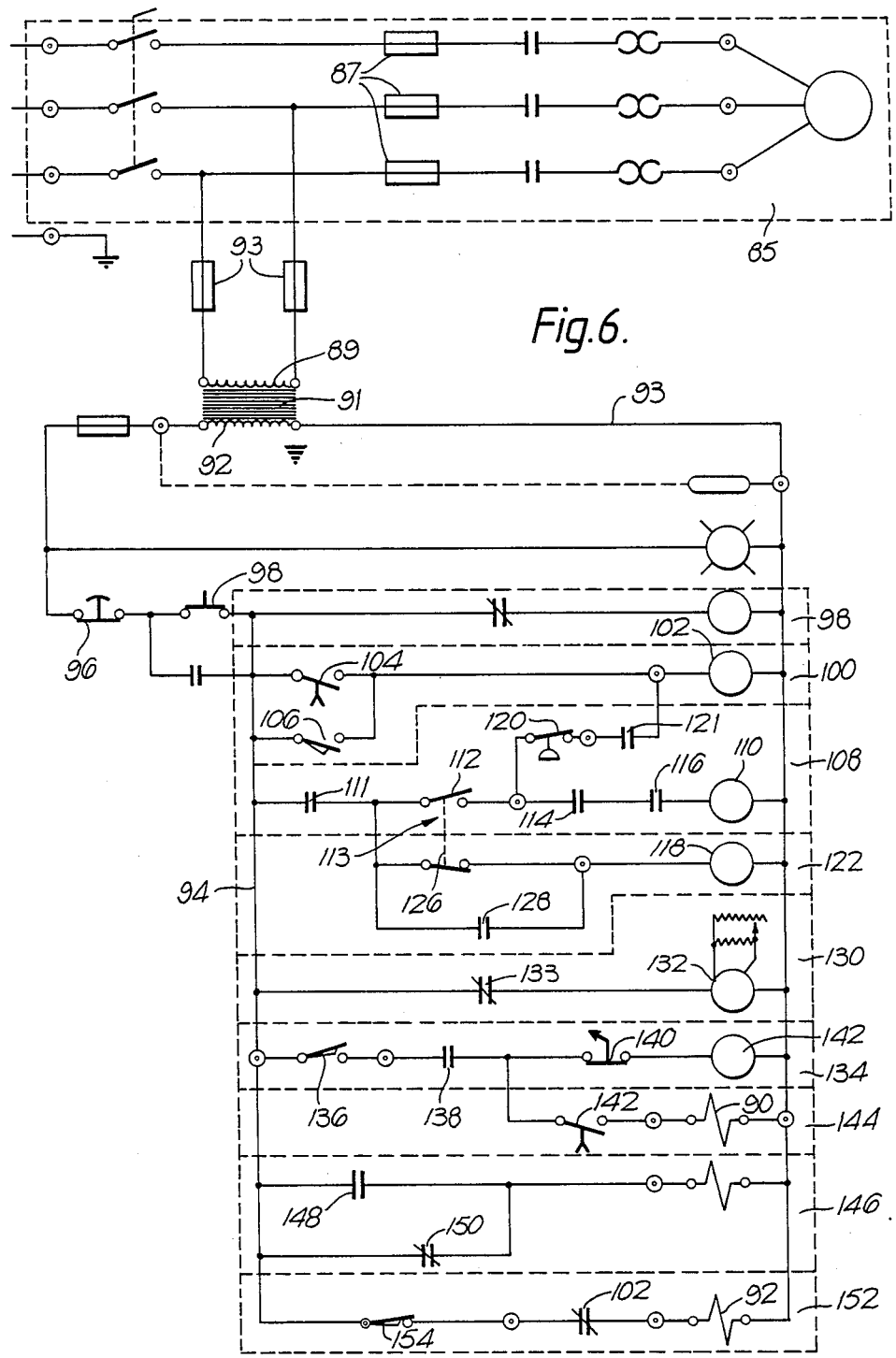
FIG. 6 shows a diagram of electrical circuitry of the apparatus shown in FIGS. 1 and 2.

The hydraulic circuitry is controlled by means of the electrical circuitry shown in FIG. 6. This is provided with a triple-phase electrical supply 85 which includes three respective 6 amp fuses 87. A primary coil 89 of a transformer 91 is connected across two of the phase lines via respective fuses 93, this coil being intended to receive a 415 volt, 10 amp electrical supply. This supply is stepped down to 110 volts in the secondary winding 92, one end of which is connected to an earth line 93 and the other end of which applies a 110 volt electrical current to a power line 94 via an emergency stop switch 96 and a start switch 98. The following sub-circuits are connected across the earth line 93 and the power line 94:

(a) a pump circuit 98 which includes the motor for driving the hydraulic pump 76;
(b) an up-relay circuit 100 comprising an up-relay 102 connected to the power line 94 via both a normally-open up-stroke timer switch 104 and an normally-open up-limit switch 106, the latter two switches being connected in parallel;
(c) a down-relay circuit 108 having a down relay 110 which is connected to the power line 94 via normally open contacts 111 of the up-relay 102, normally-open contacts 112 of a foot switch 113, a further pair of normally open contacts 114 of the up-relay 102 and a pair of normally open contacts 116 of a repeat interlock relay 118, connected in series; a pressure switch 120 and normally open contacts 121 of the down-relay 110 being connected in series across a line connecting the foot switch 113 and the said further pair of an contacts 114 of the up-relay 102, and a line connecting the timer switch 104 and up-limit switch 106 to the motor;
(d) a repeat interlock circuit 122 comprising therepeat interlock relay 118 with normally closed contacts 126 of the foot switch 113 and normally open contacts 128 of the interlock relay 118 itself connected in parallel between the relay 118 and a line connecting the first-mentioned normally open contacts 111 of the up-relay 102 and the normally open contacts 112 of the foot switch 113;
(e) an upstroke timer circuit 130 comprising an upstroke timer 132 connected in series with a pair of normally closed contacts 133 of the down-relay 110;
(f) a high pressure delay circuit 134 comprising, in series, a high pressure switch 136, normally open contacts 138 of the down relay 110, and on/off set switch 140, and a delay timer 142;
(g) a solenoid circuit 144 for the solenoid 90 of the fourpart valve 78, comprising normally open contacts of the delay timer 142 connected in series with the solenoid 90 between the earth line 93 and a line between the normally open contacts 138 of the delay circuit 134 and the set switch 140 thereof;
(h) a solenoid circuit 146 for the solenoid of the two-port valve 82, comprising that solenoid connected in series with normally-open contacts 148 of the down relay 110 and normally closed contacts 150 of the up-relay 102, the contacts 148 and 150 being connected in parallel; and
(i) a solenoid circuit 152 comprising normally closed contacts 154 of the up-limit switch 106, normally closed contacts of the up-relay 102, and the solenoid 92 of the four-port valve 78 connected in series with one another.

The operation of the rivet bush inserting machine will now be described in detail.

With the arm 14 locked in its normal position as shown in FIGS. 1 and 2, and with the anvil, anvil holder 12, punch and punch holder 18 mounted on the machine, as also shown in those Figures, the start switch 98 is closed to switch on the motor of the pump 76. At the same time, the upstroke timer 132 is energised via the normally closed contacts 133, and the solenoids 83 and 92 are energised to direct hydraulic fluid from the pump 76 to the underneath side of the piston 72, and allow fluid to drain from the side of the cylinder 80 above the piston 72, to move the punch holder 12 upwards. This movement continues until the up limit switch 106 or the timer switch 104 of the timer 132 is closed automatically, whichever occurs first.

The up-relay 182 is thereby energised, so that solenoids 83 and 92 are de-energised and the repeat interlock relay 108 is energised. The machine is now ready for a pressing operation. The sheet metal work to which a rivet bush or clinch nut is to be secured is inserted between the anvil and the punch, with the rivet bush or clinch nut inserted in a hole in the sheet where the bush or nut is to be fixed. The bush or nut is located in this way between the punch and the anvil, more precisely by the spigot 40 on the anvil 36.

The foot-switch 113 is now depressed to energise the down-relay 110. This opens the two-port valve 82 to allow fluid to drain from the underside of the piston 72 as the latter is urged downwardly under the action of the spring 81. The punch is thereby lowered initially with a relatively weak force, so that if the operator accidentally had a hand or finger between the punch and anvil, it would not be crushed since it would easily resist this weak force. Not until there is a clearance of 4 to 6 mm between the punch and anvil, which is too small for a finger or hand, does the full force of the hydraulic system come into operation. With such clearance the down limit or high pressure switch contacts 136 are released to energise the delay timer 142. At the end of a predetermined delay which is set by this timer 142, the timer delay contacts 143 are closed and solenoid 90 of the four-port valve 78 is energised. Hydraulic fluid is now fed under pressure by the pump 76 to the cylinder 80 on the upper side of the piston 72 to drive the latter downwards under full force. This force clinches the rivet bush or clinch nut onto the piece of sheet metal. When a predetermined pressure is reached, set by the pressure switch 88, the latter is opened, and the up-relay 102, which at this stage is only energised by way of the pressure switch 88, is de-energised, so that the repeat interlock relay 118 is also de-energised. Once the foot-switch 113 is released to allow re-energising of the repeat interlock relay 118, the foregoing sequence of operation can be repeated.

The set switch 140 allows the piston 72 to be lowered under the relatively weak force of the spring 81 alone, by being switched to its "on" position in which its contacts are open, thereby preventing operation of the solenoid 90 and full hydraulic pressure on the piston 72.

The same operation is used with the two different anvil holders shown in FIGS. 3 and 4, the manner in which small box-or channel-section work can be positioned to have rivet bushes inserted in upper flanges thereof being indicated in broken lines in those figures.

It will be understood that the invention is not restricted to the particular machine illustrated, which is described here by way of example only. For example, it would be possible to design the machine and/or tools therefor so that an anvil holder can be placed where the punch holder normally is, and vice versa. The anvil may then be magnetic to hold the bush or nut in position prior to clinching. Although a daylight gap of 4 to 6 mm has been given as the limit prior to full hydraulic force, the adjustable down limit switch 84 may be set for a gap anywhere in the range from 5 mm to 80 mm. Suitable timing on the delay timer 142 may reduce this to zero. Furthermore, the machine may be used as it is, or modified to perform other riveting or pressing operations, so that the invention is not limited to the insertion or fixing of rivet bushes or clinch nuts. In particular, it may be used for inserting other kinds of rivet components, as described in the opening paragraphs of this specification, into straight sheet metal, or various sizes of channel or box section metal, or solid castings or other solid parts.

Figure 8:
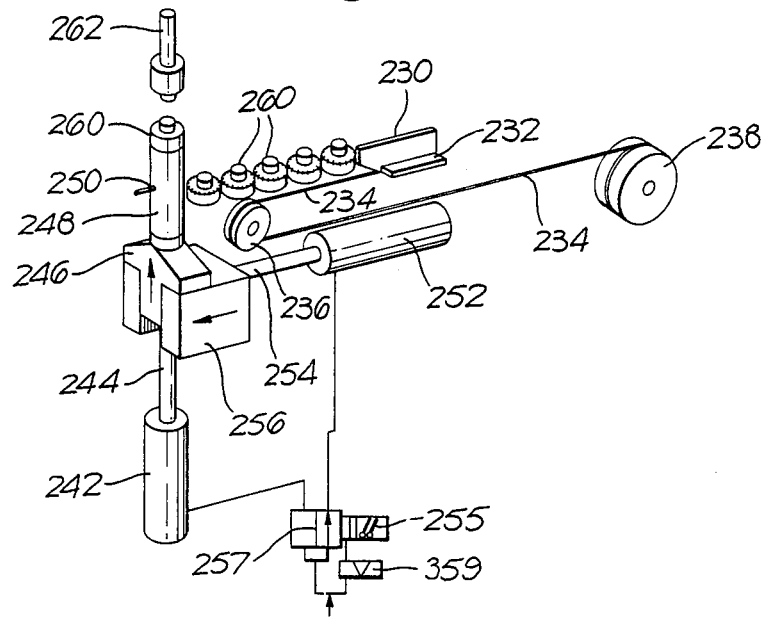
FIG. 8 is a perspective diagrammatic view of some of the parts of the feed mechanism shown in FIG. 7 in a position ready for a pressing action of a press.
Figure 7:
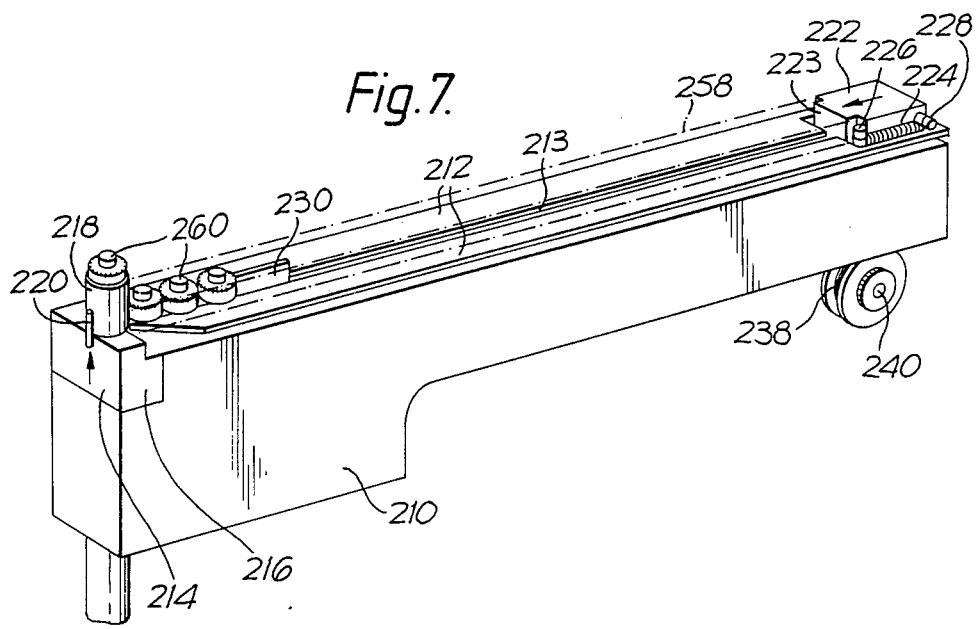
FIG. 7 is a perspective view from above and one side of a feed mechanism.
Figure 9:
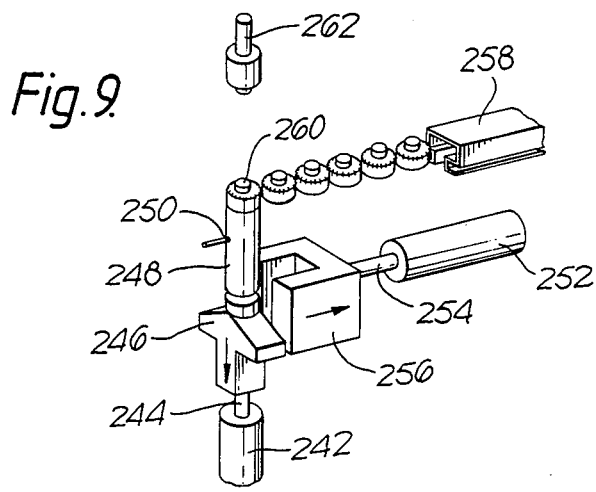
FIG. 9 is a perspective diagrammatic view of parts of the feed mechanism shown in FIG. 7 in a position in which the next fixing element from a magazine is fed to a working position on the press.

The feed mechanism shown in FIGS. 7 to 9 comprises a support body 210 having an elongate upper surface along the centre of which extends a longitudinal slot 213. Slide rails 212 are fixed to the upper surface of the support body 210 with a slight vertical spacing between the slide rails 212 and the top of the support body 210, and a horizontal spacing between the two slide rails 212 directly over the slot 213.

An anvil support 214 is held at the front and at the top of the support body 210. The anvil support 214 comprises a hollow housing part 216, from the centre of an upper wall of which extends a cylindrical hollow part 218 in an upward direction. A vertically extending slot 220 on a forward side of the anvil support 214 extends along the cylindrical part 218 and slightly into an upper end of the housing part 216. The anvil support 214 also has a bush receiving aperture (not shown) in its rear side.

At the other end of top surface of the support body 210, there is mounted a spring-loaded magazine retainer 222. It comprises a block with a forward narrowed portion 223 for engagement with one end of a magazine of fixing elements. The retainer 222 is mounted on the support body 210 in a manner which allows a small degree of horizontal movement towards and away from the forward end of the support body 210. Tension springs 224 (only one of which is shown in FIG. 7), which are each hooked at one end to a pin 226 secured to the support body 210, and at the other end to a pin 228 fixed to the retainer 222, urge the retainer 222 towards the forward end of the support body 210.

A pusher 230 protrudes upwardly between the two slide rails 212, and has flanges 232 (only the near one of which is visible in FIG. 8) engaging the gaps between the slide rail 212 and the upper surface of the support body 210. In this way it is free to slide backwardly and forwardly along the upper surface of the support body 210. A cord 234 is connected to a lower part of the pusher 230, extends towards the forward end of the feed mechanism, and is looped over a pully-wheel 236 from which it extends in a rearward direction to a drum 238 to which it is fastened. The drum 238 is provided with a spring motor (not shown) which tends to rotate the drum 238 to draw in the cord 234. This action can be stopped by means of a lock 240 provided on the drum 238.

The feed mechanism is provided with two pneumatically controlled piston and cylinder arrangements 242 and 252, the former arranged vertically and the latter horizontally, with respective piston rods 244 and 254.

The piston rod 244 carries a T-shaped support block 246 on top of which is seated an anvil pin 248. The support block 246 and pin 248 extend vertically and are in alignment with the piston rod 244. A dowel 250 extends forwardly from the anvil pin 248, from a position about two-thirds of the way up the pin.

A U-shaped support block 256 is fixed to the end of the horizontally extending piston rod 254, the U-shape extending horizontally, and the arms of the U-shape being dimensioned to fit snugly under the cross-piece of the T-shaped block 246.

The cylinder rod 254 is retracted under the action of air pressure, and extended under the action of an internal compression spring (not shown, whilst the piston rod 244 is extended under the action of pneumatic air pressure and retracted under the action of an internal compression spring (not shown).

Figure 10:
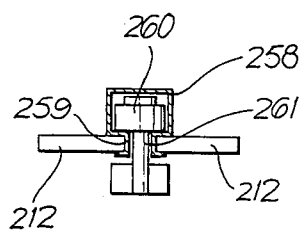
FIG. 10 is a cross-sectional view through parts of the feed mechanism shown in FIG. 7 and a magazine of fixing elements located thereon.

The switching of air between the cylinders 242 and 252 can be effected by a pilot valve 255 and a spring directional valve 257 of pneumatic circuitry of the mechanism. The directional valve 257 is held in a state for which the piston rod 244 is in its lower position, until the pilot is pressurised by energisation of a solenoid 359. With the foregoing construction, the feed mechanism is constructed to receive a magazine 258 of fixing elements 260, for example rivet bushes as illustrated, and to feed the rivet bushes 260 successively from the magazine 258 to the top of the anvil pin 248 directly underneath a punch 262 of a press such as that illustrated in FIGS. 1 and 2. The magazine 258 has, in cross section, a neck portion 259 running along its underneath side, as shown in FIG. 10, the inside of this neck portion constituting an elongate slot, extending along the length of the magazine, and opening into the magazine interior.

Prior to the mounting of the magazine onto the feed mechanism, the anvil support 214 is first removed upwardly, and then the pusher 230 is pushed back manually towards the rear end of the feed mechanism, against the force of the spring motor which operates the drum 238, until it reaches the rear end of the gap between the two slide rails 212. The drum-lock 240 is then operated to prevent the pusher 230 moving forwardly under the action of the spring motor operating on the drum 238. The magazine is then located on the feed mechanism by threading the inside edges of the slide rails 212 into the two sides of a neck 259 on the underside of the magazine 258 and then sliding the magazine further onto the top of the support body 210 until the rear end of the magazine engages the narrowed part 223 of the retainer 222. The magazine is pushed further rearwardly to the limit of the rearward travel of the retainer 222 whereupon the anvil support 214 is replaced on the support body 210 by a downward movement, so that a lower end of the support 214 is received in a recess (not shown) in the support body 210. The magazine 258 is then firmly held in position between the support 214 and the retainer 222 by virtue of the spring-loading of the retainer 222 pushing the forward end of the magazine 258 into a recess (not shwon) in the rear of the anvil support 214. The drum-lock 240 is now released, so that the spring motor of the drum 238 winds the cord 234 onto the drum 238 drawing the pusher 230 forwardly. In this way, the upper part of the pusher 230, which protrudes above the slide rails 212 and enters the elongate slot on the underside of the magazine, moves therealong until it comes into engagement with the rearmost rivet bush 260 contained in the magazine. At this point, the pusher 230 exerts a forward pressure on the line of bushes, and the first rivet bush 260 at the forward end of the magazine is pushed out of the magazine, through the aperture in the rear of the anvil support 214, and onto the top of the anvil pin 248 as shown in FIG. 9. It will not travel any further horizontally because it now abuts an inside wall of the anvil support 214.

Pressurised air is now fed to the cylinder 242 to raise the piston rod 244 together with the support 246, anvil pin 248, and the rivet bush 260 for the time being on the top of the pin 248. The upward limit of vertical travel is determined by the dowel 250 engaging the upper end of the slot 220 in the anvil support 214. In this position, the shoulders of the T-shaped block 246 are just above the top surface of the U-shaped block 256. The latter is therefore pushed horizontally forwardly under the action of the internal compression spring (not shown) in the piston 252. The lower surface of the U-shaped block 256 rests on a further support block (not shown), so that there is a rigid, solid, continuous metal support from this latter block all the way to the rivet bush 260 seated on top of the anvil pin 248. The feeding mechanism is now ready for a workpiece with an appropriately sized hole to be positioned so that its hole receives the shank of the rivet bush 260, whereupon the press can be operated so that the punch 262 comes downwardly onto the shank of the rivet bush 260 to rivet the bush to the workpiece. The pneumatic pressure is then switched by the pneumatic circuitry so that it is directed into the cylinder 252 instead of the cylinder 242, whereupon the block 256 is drawn rearwardly and the T-shaped block 246, together with the anvil pin 248, is drawn downwardly under the action of the compression spring in the cylinder 242.

Directly the top of the anvil-pin 248 falls below the underside of the next rivet bush 260 in the magazine 258, that bush will be pushed forwardly onto the top of the anvil pin 248 under the action of the pusher 230, the cord 234, the pulley wheel 236 and the spring-driven drum 238. The anvil-pin 248 is then raised again in the same manner as just described and the whole process can be repeated a number of times until the magazine is exhausted.

Figure 11:
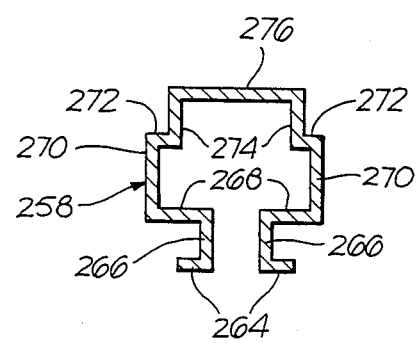
FIG. 11 is a cross-sectional view through a modified magazine container.

FIG. 11 shows a modified embodiment of rivet bush magazine. The Figure shows a cross-section of an elongate magazine. In cross-section, the magazine has two flange portions 264 extending outwardly from a lower end of a neck portion defined by two upwardly extending wall portions 266. Two base wall portions 268 extend outwardly from the upper ends of the vertical neck wall portions, and two side walls 270 extend upwardly from the outer edges of the base portions 268, at the top of which side walls 270 are respective shoulders 272. The main parts of the rivet bushes are housed in this section of the magazine defined between the shoulder 272 and the neck portion 266. Two further shorter side wall portions extend upwardly from the shoulders 272 and are bridged by a top wall 276 to provide a cover around the shank portions of the rivet bushes. The interior of the magazine is open via the neck portion, so that when the pusher 230 is inserted through the inside of the neck portion, it can come into contact with the rivet bushes contained in the magazine.

The feed mechanism shown in FIGS. 7 to 9 can be mounted removably on the swingable arm of the press illustrated in FIGS. 1 and 2.

FIG. 12 shows modified forms of punch holder and anvil holder for use with such a press. Both holders are removeably mountable on to the press in the same way as the holders specifically described with reference to FIGS. 1 and 4. The holders have been modified in that each are provided with a bore for receiving the shank portion of a punch, or bush locator or anvil, and spring-loaded retaining means to hold the anvil or punch removeably once their shanks have been inserted. Thus FIG. 12 shows a punch holder 300 having a bore 310 extending upwardly from a lower tip of the holder 300. A further bore 320 extends transversely of the first bore. This transverse bore 320 accommodates a ball 330. The ball protrudes slightly outwardly from both ends of the transverse bore 320. That part of the ball 330 which protrudes from the outer end of the transverse bore 320 is acted upon by a free end of a leafspring 340, the other end of which is clamped to the punch holder 300, at a position above the longitudinal bore 310 and transverse bore 320, by means of a screw 350. The ball is prevented from being pushed all the way into the vertical bore 440 by a narrowing of the transverse bore 320 where it meets the vertical bore 310.

A removeable punch 360 having a shank portion 370, the main diameter of which is just smaller than the diameter of the bore 310, can be removeably attached to the punch holder by insertion of its shank portion into the bore 310. The shank portion 370 is formed or otherwise made with a neck portion 380, the greater part of the length of which comprises a slanting surface 390 which tapers towards the main part of the punch 360.

Thus, when the shank 370 of the punch 360 is inserted into the bore 310 of the punch holder 300, and the shank is pushed fully home, the ball 330 engages the neck portion 380 of the shank 370 and the ball 330, urged inwardly by the leaf-spring 340, restrains downward movement of the punch 360. This restraining force is relatively weak, but is sufficient to hold the punch against the force of gravity. This is advantageous, because whereas the high forces involved in the pressing action are resisted by the tip of the punch holder 300 acting directly on the shank side of the main part of the punch 360 only a low manual force is required to remove the punch 360 from the holder 300 in a downward direction in relation to the holder 300.

The manner in which an anvil 400, which is provided with a locating spigot 405, is retained in the anvil holder 410 is precisely analogous except that the ball 420 is here urged along a transverse bore 430 into an upright bore 440 by a compression spring 450 which extends within the transverse bore 430. The end of the spring 450 which is further from the ball 420 abuts a screw threaded member 470.

Figure 13:
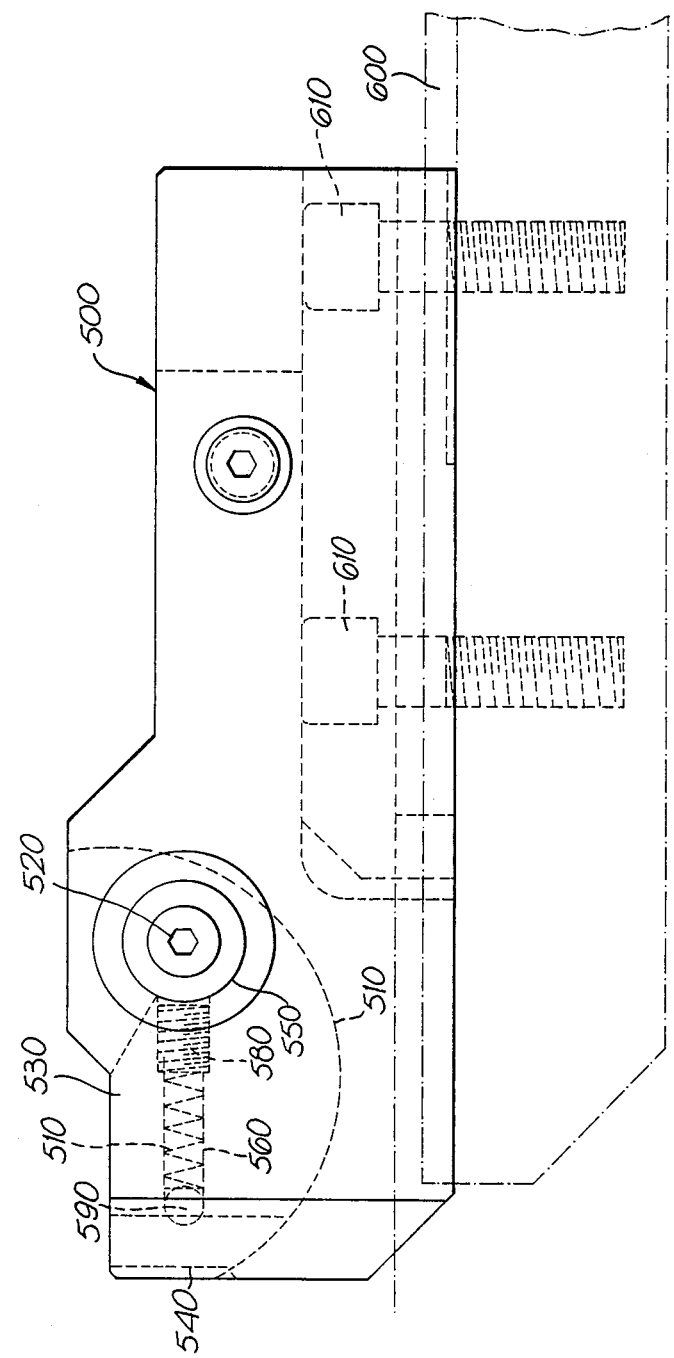
FIGS. 13 to 15 show respective side elevational views of modified forms of anvil holders.

FIG. 13 shows how an anvil holder such as the one illustrated in FIG. 1 can be modified to have the facility for removeably holding an anvil in the manner illustrated in FIG. 12. The anvil holder 500 has an arcuate recess 510 in its forward end, across which extends an abutment bar 520. A substantially semi-circular anvil holder 530 is seated in the recess 510, the curved surface of the anvil holder 530 having the same radius of curvature as the arcuate recess 510, and resting thereon. A vertical bore 540 extends through a forward end of the anvil holder 530, and a semi-circular recess 550 is formed or machined in an upper surface of the rear end of the anvil holder 530, and engages the abutment bar 520 to prevent the anvil holder 530 rotating in the arcuate recess 510 during operation of the press.

As with the anvil holder illustrated in FIG. 12, the anvil holder 530 in FIG. 13 also has a transverse bore 560, a helical compression spring 570 extending within the transverse bore 560, a screwthreaded abutment 580 and a ball 590 which is urged towards the vertical bore 540 by the helical spring 570. It is prevented from being pushed wholly within the bore 540 by means of a narrowing of the transverse bore 560 where it meets the vertical bore 540.

FIG. 13 also shows in greater detail how the anvil holder 500 is removeably supported on the swingable arm of the press shown in FIGS. 1 and 2. Thus the upper surface of the swingable arm is formed with a channel 600 into which the anvil holder 500 fits snugly, the horizontal location of the anvil holder fixed precisely by means of Allan screws 610 which engage both the anvil holder 500 and the swingable arm of the press.

Figure 14:
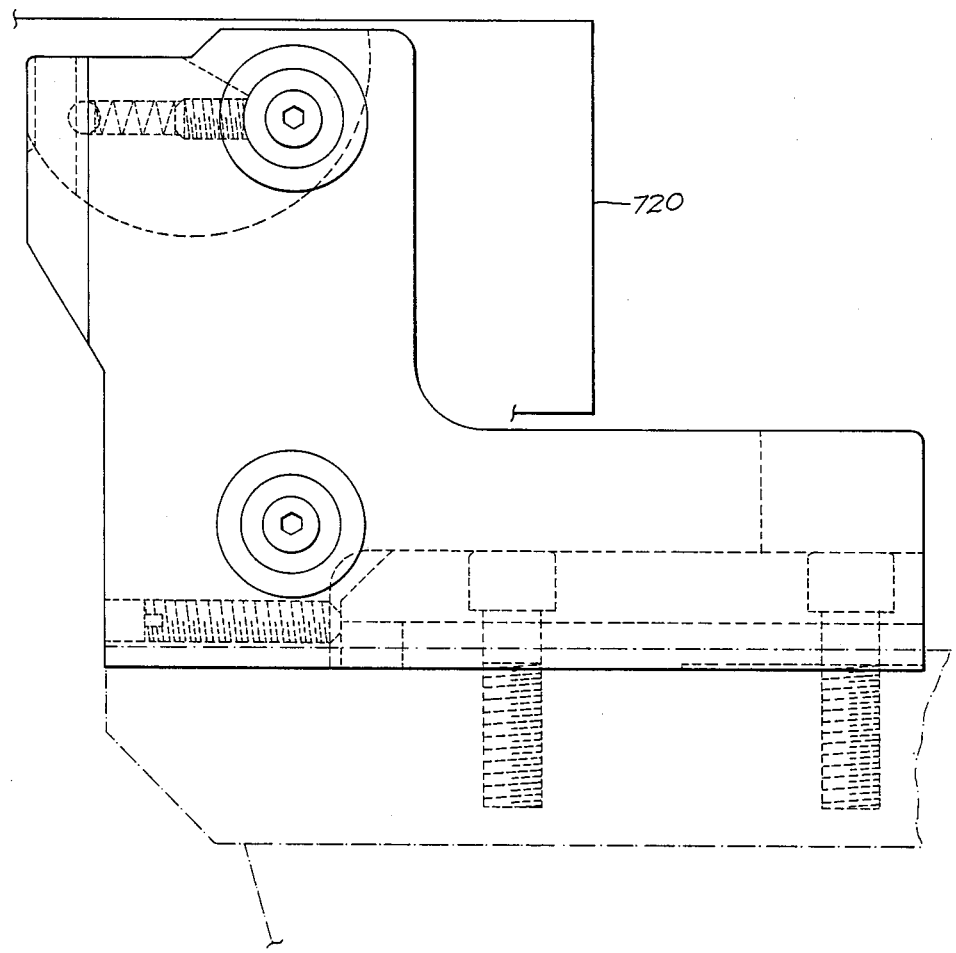
Figure 15:
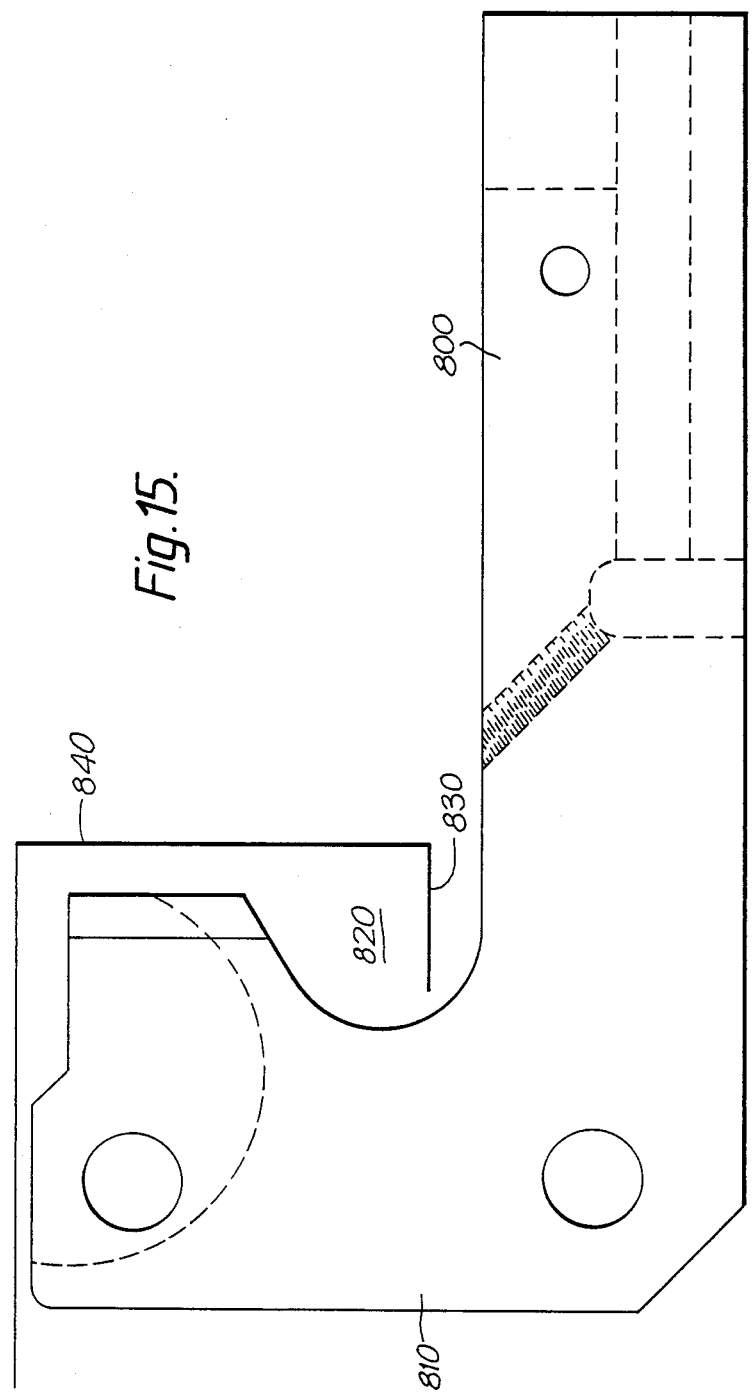

FIGS. 14 and 15 show different shapes of anvil holder to facilitate access to different parts of awkwardly shaped workpieces. Thus, in FIG. 14, the anvil support end of the anvil holder has been raised in relation to that part of the anvil holder which is secured to the swingable arm of the press. This gives access to the inner side of a channel section work-piece such as the one labelled 720 in FIG. 14. Similarly for FIG. 15, except that in this case the lower part of the anvil holder 800 has been extended forwardly to allow the anvil supporting part 810 of the holder to be reversed. This provides a throat 820 of the anvil holder which faces rearwardly and can accommodate an inturned flange 830 of a channel sectioned work-piece 840. The work-piece 840 can therefore be positiond over the anvil holder with the actual anvil positioned adjacent to an interior surface of the work-piece, directly opposite the inturned flange 830, as shown in FIG. 15.

Whilst particular constructions of the feed mechanism and anvil and punch holders have been described with reference to the drawings, the reader will appreciate that numerous variations are possible without departing from the scope of the present invention. For example, although the pusher 230 in FIGS. 7 to 9 has been shown as being moved by a cord 234 wound around a pulley wheel 236 and back to a spring-wound drum 238, it may instead be pushed by a compression spring, although this is less desirable in view of the increased length of the feeding mechanism required to accommodate such a compression spring. Another possibility is to have a rod which can be urged into a bush-holding magazine under the action of a compression spring, to feed bushes successively to an anvil. Whilst this avoids the necessity of having an underneath slot in the magazine, it does have the disadvantage that an increased length of feeding mechanism is needed to accommodate the rod. This might be avoided by using a flexible rod that passes through a U-turn guide at the rear end of the feed mechanism.

As regards the punch and anvil holder shown in FIG. 12, although the transverse bores have been shown as substantially perpendicular to the vertical bores, this is not essential, the main requirement for this particular embodiment being that the angles of the sloping surfaces of the shank neck portions which engage the balls, in relation to the axes of the transverse bores, irrespective of whether these bores are at right angles to the vertical or upright bores, is such that movement of the punch or anvil away from its holder will move the ball against its spring-loading out of its retaining position.

Furthermore, although it is preferable to use a ball as the retaining means, it is not essential. Instead of a ball, it would be possible for example to have a stud on the end of the leaf spring 340 in the case of the punch holder, or an elongate stud in the case of the anvil holder 410, the stud having a curved free end which protrudes into the verticle bore. These variations are only given by way of example of the many possible modifications which will readily occur to the reader without taking the devices clear of the present invention.

We claim:

1. A press comprising:
   (a) a frame;
   (b) an anvil support provided on said frame;
   (c) a moveable punch carrier provided on said frame;
   (d) drive means on said frame having a working part which is arranged to urge said moveable punch carrier in a direction towards said anvil support;
   (e) means, being part of said press, defining two ends of travel between which said working part is moveable to move said punch carrier towards and away from said anvil support, said punch carrier being connected to said working part so that, throughout the length of said travel, said punch carrier and said working part move together;
   (f) a limit switch connected to said drive means and switchable from a first condition in which said drive means are prevented from exerting a working force on said punch carrier to a second condition in which it enables said drive means to exert a working force on said punch carrier in said direction;
   (g) switch means of said limit switch positioned to detect whether said working part, as the latter moves to bring said punch carrier closer to said anvil support, has reached a position where the remaining available travel for said working part is less than a finger's width, and to cause said limit switch to be switched from said first condition to said second condition when it detects that said working part has reached said position; and
   (h) adjustment means between said punch carrier and said working part to enable the position of said punch carrier relative to said working part to be adjusted towards and away from said anvil support.

2. A press according to claim 1, wherein said remaining available travel is substantially in the range from 4 mm to 6 mm.

3. A press according to claim 1, wherein that one of the said two ends of travel which is closer to the anvil support is defined by a part of the drive means.

4. A press according to claim 1, wherein said working part is the piston of an hydraulic piston and cylinder arrangement of the press.

5. A press according to claim 4, wherein that one of the said two ends of travel which is closer to the anvil support is defined by one end of the travel of the piston within the cylinder.

6. A press according to claim 1, further comprising a further limit switch which defines that one of said two ends of travel which is further from said anvil support.

7. A press according to claim 1, further comprising a timer switch which determines the time between the start of the movement of said working part away from said anvil support and the next stroke in the pressing direction, in default of said working part reaching that end of its travel which is further from said anvil support.

8. A press according to claim 1, further comprising a timer switch connected to provide a delay between the time when said limit switch mentioned in claim 27 is operated and the time when the said working force is exerted.

9. A press comprising:
   (a) a frame;
   (b) an anvil support provided on said frame;
   (c) a moveable punch carrier provided on said frame;
   (d) drive means on said frame having a working part which is arranged to urge said moveable punch carrier in a direction towards said anvil support;
   (e) means, being part of said press, defining two ends of travel between which said working part is moveable to move said punch carrier towards and away from said anvil support, said punch carrier being connected to said working part so that, throughout the length of said travel, said punch carrier and said working part move together;
   (f) A limit switch connected to said drive means and switchable from a first condition in which said drive means are prevented from exerting a working force on said punch carrier to a second condition in which it enables said drive means to exert a working force on said punch carrier in said direction;
   (g) switch means of said limit switch positioned to detect whether said working part, as the latter moves to bring said punch carrier closer to said anvil support, has reached a position where the remaining available travel for said working part is less than a finger's width, and to cause said limit switch to be switched from said first condition to said second condition when it detects that said working part has reached said position;
   (h) a first working-fluid flow path between a fluid valve and the cylinder interior on one side of the piston;
   (i) a second working-fluid flow path between said valve and the cylinder interior on the other side of the piston;
   (j) a third working-fluid flow path between said valve and a fluid reservoir;
   (k) a fourth working-fluid flow path between said valve and said fluid reservoir; and
   (l) a pump in the third working-fluid flow path which serves to urge fluid from said reservoir to the cylinder via the valve, the latter being adjustable selectively to any one of three settings in a first of which the third and fourth paths are connected together, in a second setting of which the third path is connected to the first and the fourth is connected to the second, and in a third setting of which the third path is connected to the second and the fourth is connected to the first, so that with these three settings said pump may selectively drive fluid straight back to said reservoir, or to the cylinder to drive said punch carrier towards said anvil support, or to the cylinder to drive said punch carrier away from said anvil support.

10. A press according to claim 9, wherein a two-way valve is positioned in the said second working fluid flow path.

11. A press according to claim 9, wherein a pressure adjuster switch is connected to the said first working-fluid flow path to adjust the pressure of fluid in that path.

12. A press comprising:
   (a) A frame;
   (b) an anvil support provided on said frame;
   (c) a moveable punch carrier provided on said frame;

(d) drive means on said frame having a working part which is arranged to urge said moveable punch carrier in a direction towards said anvil support;

(e) means, being part of said press, defining two ends of travel between which said working part is moveable to move said punch carrier towards and away from said anvil support, said punch carrier being connected to said working part so that, throughout the length of said travel, said punch carrier and said working part move together;

(f) a limit switch connected to said drive means and switchable from a first condition in which said drive means are prevented from exerting a working force on said punch carrier to a second condition in which it enables said drive means to exert a working force on said punch carrier in said direction;

(g) switch means of said limit switch positioned to detect whether said working part, as the latter moves to bring said punch carrier closer to said anvil support, has reached a position where the remaining available travel for said working part is less than a finger's width, and to cause said limit switch to be switched from said first condition to said second condition when it detects that said working part has reached said position;

(h) adjustment means between said punch carrier and said working part to enable the position of said punch carrier relative to said working part to be adjusted towards and away from said anvil support;

(i) a first working-fluid flow path between a fluid valve and the cylinder interior on one side of the piston;

(j) a second working-fluid flow path between said valve and the cylinder interior on the other side of the piston;

(k) a third working-fluid flow path between said valve and a fluid reservoir;

(l) a fourth working-fluid flow path between said valve and said fluid reservoir; and (m) a pump in the third working-fluid flow path which serves to urge fluid from said reservoir to the cylinder via the valve, the latter being adjustable selectively to any one of three settings in a first of which the third and fourth paths are connected together, in a second setting of which the third path is connected to the first and the fourth is connected to the second, and in a third setting of which the third path is connected to the second and the fourth is connected to the first, so that with these three settings said pump may selectively drive fluid straight back to said reservoir, or to the cylinder to drive said punch carrier towards said anvil support, or to the cylinder to drive said punch carrier away from said anvil support.

* * * * *